(12) United States Patent
Clarke et al.

(10) Patent No.: US 8,131,055 B2
(45) Date of Patent: Mar. 6, 2012

(54) SYSTEM AND METHOD FOR ASSEMBLY INSPECTION

(75) Inventors: Burton Roland Clarke, Cuba, IL (US); John Edward Norlin, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1068 days.

(21) Appl. No.: 12/010,956

(22) Filed: Jan. 31, 2008

(65) Prior Publication Data

US 2009/0198464 A1    Aug. 6, 2009

(51) Int. Cl.
 *G06K 9/00*    (2006.01)
(52) U.S. Cl. ......... 382/141; 382/145; 382/147; 382/149
(58) Field of Classification Search ........... 382/141–152
 See application file for complete search history.

(56) References Cited

U.S. PATENT DOCUMENTS

| | | | |
|---|---|---|---|
| 3,889,053 A * | 6/1975 | Lloyd et al. | 348/129 |
| 4,056,716 A * | 11/1977 | Baxter et al. | 382/148 |
| 4,433,385 A | 2/1984 | De Gasperi et al. | |
| 4,486,775 A * | 12/1984 | Catlow | 348/94 |
| 4,978,224 A * | 12/1990 | Kishimoto et al. | 356/394 |
| 5,796,868 A * | 8/1998 | Dutta-Choudhury | 382/199 |
| 5,815,198 A * | 9/1998 | Vachtsevanos et al. | 348/88 |
| 5,940,538 A * | 8/1999 | Spiegel et al. | 382/236 |
| 6,650,779 B2 * | 11/2003 | Vachtesvanos et al. | 382/228 |
| 6,658,145 B1 * | 12/2003 | Silver et al. | 382/149 |
| 7,006,669 B1 | 2/2006 | Lavagnino et al. | |
| 7,024,032 B2 | 4/2006 | Kidd et al. | |
| 7,149,337 B2 | 12/2006 | Michaelis et al. | |
| 7,167,583 B1 * | 1/2007 | Lipson et al. | 382/147 |
| 7,190,834 B2 | 3/2007 | Davis | |
| 7,315,644 B2 | 1/2008 | Macy et al. | |
| 2002/0054702 A1 * | 5/2002 | Wihl et al. | 382/145 |
| 2005/0008213 A1 | 1/2005 | Shankarappa et al. | |
| 2005/0018216 A1 * | 1/2005 | Barsness et al. | 358/1.6 |
| 2005/0147287 A1 | 7/2005 | Sakai et al. | |
| 2005/0281452 A1 * | 12/2005 | Usikov | 382/141 |
| 2005/0281453 A1 | 12/2005 | Boyer | |
| 2006/0111797 A1 | 5/2006 | Saito et al. | |
| 2007/0122026 A1 | 5/2007 | Ersue et al. | |
| 2007/0177787 A1 | 8/2007 | Maeda et al. | |

OTHER PUBLICATIONS

Clemens Von Bank et al., "A visual quality inspection system based on a hierarchical 3d pose estimation algorithm" (Daimler Chrysler Research and Technology, Springer Berlin, vol. 2781, Sep. 6, 2003, pp. 179-186.

S. A. Hojjatolesami and J. Kittler, *Region Growing: A New Approach*, IEEE Transactions on Image Processing, vol. 7, No. 7 Jul. 1998 (5 pages).

(Continued)

*Primary Examiner* — Gregory J Toatley
*Assistant Examiner* — Jarreas C Underwood
(74) *Attorney, Agent, or Firm* — Finnegan, Henderson, Farabow, Garrett & Dunner LLP

(57) ABSTRACT

A method for assembly inspection is disclosed. The system may include obtaining a digital image of an assembled product, extracting images of one or more objects from the digital image of the assembled product, and recognizing each of the one or more objects as a component based on its extracted image and a library of standard components. The method may further include identifying one or more features of each recognized component, comparing each of the one or more identified features with a corresponding standard feature of the corresponding standard component, and determining an assembly fault if at least one of the one or more identified features does not match the corresponding standard feature.

18 Claims, 5 Drawing Sheets

OTHER PUBLICATIONS

Theo Pavlidis et al., *Integrating Region Growing and Edge Detection*, IEEE Transactions on Pattern Analysis and Machine Intelligence, vol. 12, No. 3 Mar. 1990 (pp. 225-233).

Yian-Leng Chang and Xiaobo Li, *Adaptive Image Region-Growing*, IEEE Transactions on Image Processing, vol. 3, No. 6, Nov. 1994 (5 pages).

Rolf Adams and Leanne Bischof, *Seeded Region Growing*, IEEE Transactions on Pattern Analysis and Machine Intelligence, vol. 16, No. 6, Jun. 1994 (pp. 641-647).

Peihan Wen et al., *Automated Inspection of Flexible Assembly: System Design and Algorithm Research*, IEEE/ASME International Conference, Oct. 12-15, 2008 (pp. 222-227).

* cited by examiner

SYSTEM AND METHOD FOR ASSEMBLY INSPECTION

TECHNICAL FIELD

The present disclosure relates generally to a system and method for inspection, and relates more particularly to a system and method for assembly inspection.

BACKGROUND

Production of industrial engines and off-highway equipment usually involves the assembly of multiple flexible systems, such as hydraulic hoses and wiring harnesses. Assembly faults may cause malfunctions or inefficiencies of the product. Assembly faults may include, for example, missing fasteners and hoses, misrouting of hoses or wires, rubbing of hoses, wires or belts, wrong dimension of hoses or belts, etc. In order to ensure that the systems and parts are correctly assembled, inspection of the product during the assembly process is needed. Assembly inspections are conventionally performed manually by experienced inspectors. During the manual inspection, inspectors usually compare the assembled product with a design chart and detect an assembly fault when there is a difference between the two.

However, manual inspection may be inaccurate and may lead to uncertainties of the defect inspection process. The assembled products may visually vary among each other, and directly matching them with their design charts may lead to mistakes during the visual inspection process. For example, flexible assemblies such as hydraulic hoses may be present in a different orientation or shape as those in the design chart. In addition, manual inspection requires skilled, human labor and can be time-consuming. Therefore, it is desirable to automate the inspection process of machine assemblies.

Several automated inspection systems have been developed that utilize digital image processing techniques to perform assembly inspections. An example of such an automated inspection system is disclosed in U.S. Patent Publication No. 2005/0147287 to Sakai et al. ("the '287 publication"). In particular, the '287 publication discloses a pattern defect inspection method and apparatus that reveal defects on an inspection target. The pattern defect inspection apparatus compares images of corresponding areas of two formed patterns that should be identical with each other, and identifies a defect if any mismatches occur between the images. In particular, the image comparison process may be performed on a plurality of areas simultaneously. Further, the pattern defect inspection apparatus also converts the gradation of the image signals of compared images in each of a plurality of different processes, so that images with the same patterns but different brightness may be properly compared.

Although the method and apparatus of the '287 publication may alleviate some of the problems of manual assembly inspections, it may still be problematic. First, the process may still be inaccurate. A product may include a plurality of assemblies. While it is important that each assembly is correctly assembled, the relative position of the plurality of assemblies may vary from one product to another. The inspection apparatus disclosed by the '287 publication uses the overall pattern of the image, instead of image regions of individual components, and relies on the global matching between images. Therefore, a defect may be incorrectly detected because a relative position between a flexible assembly and other components may be different from that dictated in a design chart. For example, the wirings of the circuit disclosed by the '287 publication may be correct, but the relative location or orientation of the flexible wires may be distinctive from the pattern in the design chart. Such a circuit may be incorrectly determined as faulty by the '287 publication. In addition, because objects in the image are not extracted and identified, the '287 publication may not facilitate identification of specific component assembly faults and provide an informative diagnosis report, besides detecting the existence of such a fault.

The system and method of the present disclosure is directed towards overcoming one or more of the constraints set forth above.

SUMMARY

In one aspect, the present disclosure is directed to a method for assembly inspection. The system may include obtaining a digital image of an assembled product, extracting images of one or more objects from the digital image of the assembled product, and recognizing each of the one or more objects as a component based on its extracted image and a library of standard components. The method may further include identifying one or more features of each recognized component, comparing each of the one or more identified features with a corresponding standard feature of the corresponding standard component, and determining an assembly fault if at least one of the one or more identified features does not match the corresponding standard feature.

In another aspect, the present disclosure is directed to a system for assembly inspection. The system may include an imaging device configured to obtain a digital image of an assembled product, and a storage device configured to store an assembly inspection tool, a library of standard components and one or more standard features of each standard component. The system may further include a processor configured to execute the assembly inspection tool to extract images of one or more objects from the digital image of the assembled product, and recognize each of the one or more objects as a component based on its extracted image and a library of standard components. The processor may be further configured to execute the assembly inspection tool to identify one or more features of each recognized component, compare each of the one or more identified features with the corresponding standard feature of the corresponding standard component, and determine an assembly fault if at least one of the one or more identified features does not match the corresponding standard feature. The processor may also be further configured to execute the assembly inspection tool to diagnose the assembly fault, and determine a type and a location of the assembly fault.

DETAILED DESCRIPTION

Figure 1:
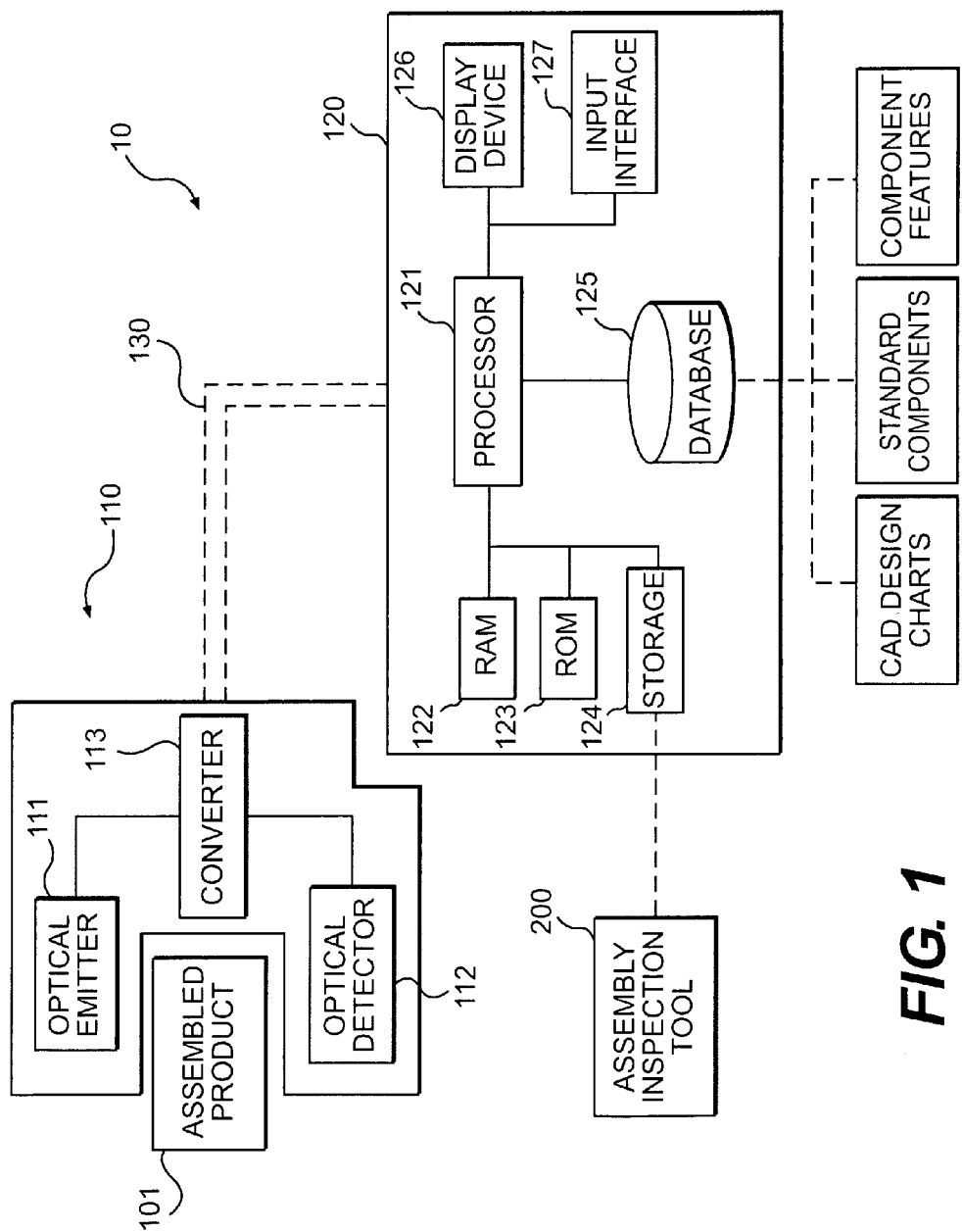
FIG. 1 is a schematic diagram of an assembly inspection system according to an exemplary embodiment of the present disclosure.

FIG. 1 is a schematic diagram of an assembly inspection system 10 according to an exemplary embodiment of the present disclosure. An assembly inspection system 10 may include an imaging device 110, an assembly inspection console 120, and a transmission device 130 connecting imaging device 110 and assembly inspection console 120. Assembly inspection system 10 may be configured to inspect an assembled product 101 and detect an assembly fault in an automated manner. For example, assembled product 101 may be an engine, in which a plurality of flexible systems, such as hydraulic hoses and wiring harnesses, may be installed. However, one skilled in the art will know that assembled product 101 may be any other equipment that includes a plurality of any other types of suitable assemblies.

Imaging device 110 may include, among other things, an optical emitter 111, an optical detector 112, and a converter 113. For example, imaging device 110 may be a digital camera. Optical emitter 111 may include one or more optical emitting devices, for example, light emitting diodes (LEDs), configured to apply a first optical signal for illuminating assembled product 101. Consistent with one disclosed embodiment, optical emitter 111 may be configured to operate only when the ambient light around assembled product 101 is not sufficient, similar to a flash of a digital camera. Optical detector 112 may include one or more optical receiving devices, for example, photodiodes or charge-coupled devices (CCDs), configured to receive a second optical signal containing the structure information of assembled product 101. According to one disclosed embodiment, optical emitter 111 and optical detector 112 may be positioned at the same side of assembled product 101, and the second optical signal may be associated with a reflection signal of the first optical signal that is reflected by assembled product 101. According to another disclosed embodiment, optical emitter 111 and optical detector 112 may be positioned at the opposite sides of assembled product 101, and the second optical signal may be associated with a residual of the first optical signal that is attenuated by assembled product 101. Imaging device 110 may further include a converter 113 configured to convert the received optical signal to a digital image, wherein each pixel value of the digital image is proportional to a signal intensity received at each pixel.

The digital image obtained by imaging device 110 may be transmitted to assembly inspection console 120 via transmission device 130. According to one disclosed embodiment, assembly inspection console 120 may be located close to imaging device 110, and transmission device 130 may be a physical transmission device, such as a cable. According to another disclosed embodiment, assembly inspection 120 may be located a distance away from imaging device 110, and transmission device 130 may be a wireless transmission device, such as a wireless network.

According to one disclosed embodiment, imaging device 110 may further include a data compressor (not shown) to compress the digital image, so that the image transmission cost and/or image transmission time may be reduced. For example, a compressed digital image may require less bandwidth from transmission device 130. Accordingly, a compressed image may be more efficiently transmitted via transmission device 130.

Assembly inspection console 120 may include one or more computer assemblies configured to detect an assembly fault associated with assembled product 101, based on digital images received from imaging device 110. Assembly inspection console 120 may be associated with one or more software applications, including, for example, an assembly inspection tool 200. Assembly inspection tool 200 may run on assembly inspection console 120, and may be accessed by an authorized user. The assembly inspection tool 200 may be stored on a computer readable medium, such as a hard drive, computer disk, CD-ROM, or any other suitable medium.

Assembly inspection console 120 may include a processor 121, a random access memory ("RAM") 122, a read-only memory ("ROM") 123, a storage device 124, a database 125, a display device 126, and an input interface 127. It is contemplated that assembly inspection console 120 may include additional, fewer, and/or different components than those listed above. It is understood that the type and number of listed devices are exemplary only and not intended to be limiting.

Processor 121 may be a central processing unit ("CPU"). Processor 121 may execute sequences of computer program instructions to perform various processes that will be explained in greater detail below. The computer program instructions may be accessed and read from ROM 123, or any other suitable memory location, and loaded into RAM 122 for execution by processor 121. Depending on the type of assembly inspection console 120 being used, processor 121 may include one or more printed circuit boards, and/or a microprocessor chip. Processor 121 may further include a data de-compressor (not shown) configured to de-compress the digital image that is compressed at imaging device 110.

Storage device 124 may include any type of mass storage suitable for storing information. For example, storage device 124 may include one or more hard disk devices, optical disk devices, or any other storage devices that provide data storage space. In one embodiment of the present disclosure, database 125 may store data related to the assembly inspection process, such as a computer aided design (CAD) chart of an assembled product 101, standard components converted from the CAD design chart, and standard features of each standard component. Database 125 may also include analysis and organization tools for analyzing and organizing the information contained therein.

Assembly inspection console 120 may be accessed and controlled by a user, using input interface 270. Assembly inspection console 120 may also provide visualized information to the user via display device 126. For example, display device 126 may include a computer screen (not shown) and provide a graphical user interface ("GUI") to the user. Display device 126 may also display an inspection report to the user indicating a type and a location of an assembly fault. Input interface 127 may be provided for the user to input information into assembly inspection console 120, and may include, for example, a keyboard, a mouse, and/or optical or wireless computer input devices (not shown). The user may input control instructions via input interface 127 and control the operation of imaging device 110. The user may also input parameters to adjust the operation of assembly inspection console 120.

Figure 2:
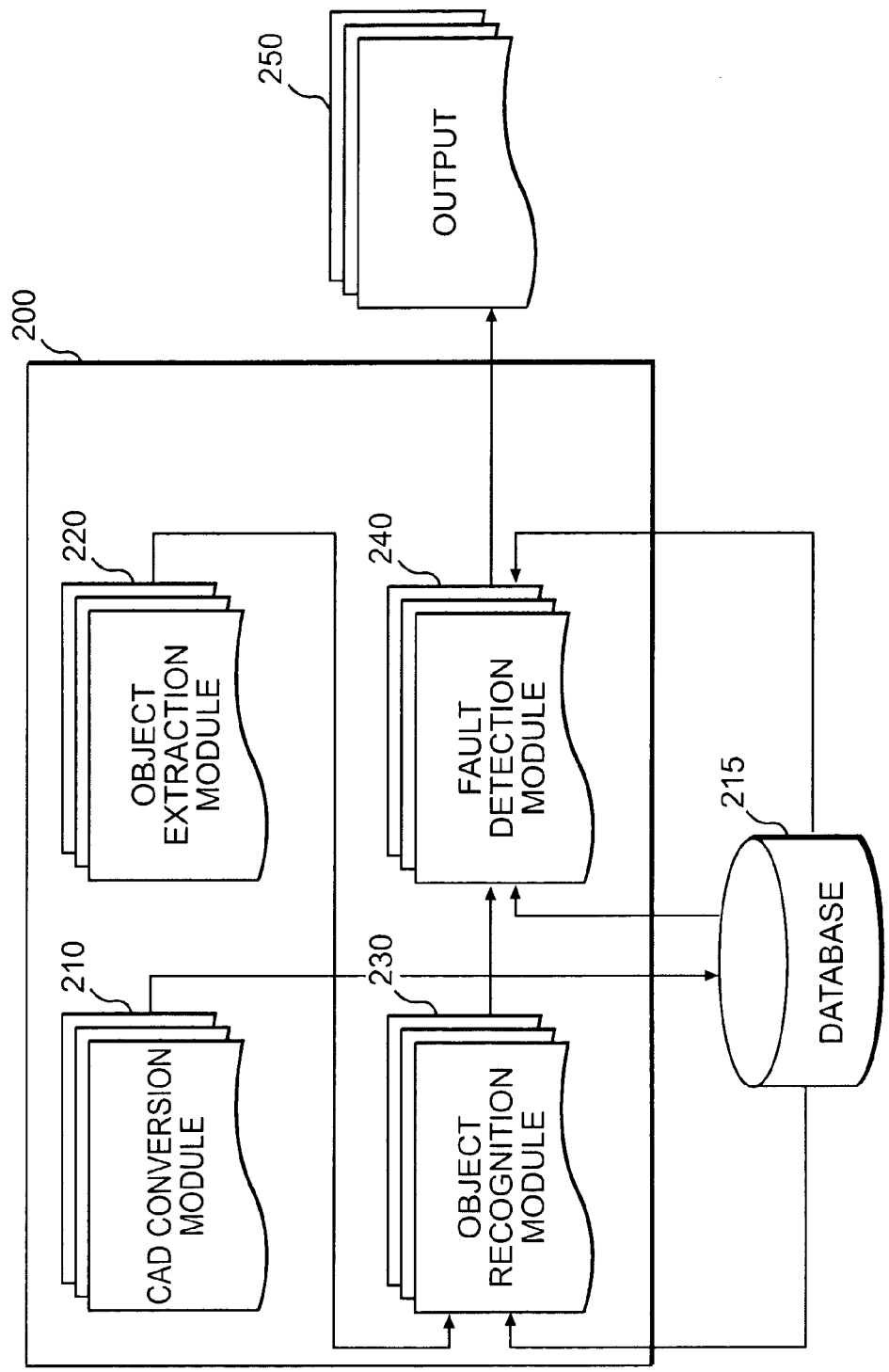
FIG. 2 is a schematic diagram of an assembly inspection tool, consistent with the disclosed embodiment shown in FIG. 1.

Assembly inspection console 120 may be configured to execute assembly inspection tool 200. Assembly inspection tool 200 may include one or more modules. FIG. 2 is a schematic diagram of an assembly inspection tool, consistent with the disclosed embodiment shown in FIG. 1. As shown in FIG. 2, assembly inspection tool 200 may include a CAD conversion module 210, an object extraction module 220, an object recognition module 230, and a fault detection module 240. CAD conversion module 210 may receive a CAD design chart of an assembled product 101 from database 215. CAD conversion module 210 may be configured to convert the design chart to a library of standard components. CAD conversion module 210 may be further configured to identify one or more standard features of each standard component. The library of standard components and their corresponding standard features may be output by CAD conversion module 210 and be stored in database 215.

Object extraction module 220 may receive the digital image of assembled product 101, obtained by imaging device 110, as an input. Object extraction module 220 may be configured to extract images of one or more objects from the digital image. According to an embodiment consistent with the present disclosure, object extraction module 220 may be configured to first extract images of one or more rigid objects, such as fasteners. The locations of rigid objects may be well predicted based on the CAT design chart. Object extraction module 220 may be further configured to grow images of one or more flexible objects, such as hoses that are connected to fasteners, based on the extracted images of one or more rigid objects. For example, the image of a hose may be grown between two coupling fasteners. Flexible objects may be usually present in a different orientation or shape compared to those in the CAT design chart. Object extraction module 220 may be yet further configured to extracted images of the one or more flexible objects. The extracted images may be output by object extraction module 220, and may be received as input by object recognition module 230. Object recognition module 230 may be configured to recognize each object based on its extracted image and a library of standard components. Object recognition module 230 may be further configured to identify one or more features of each recognized component.

The identified features of the recognized component may be output by object recognition module 230 and received as input by fault detection module 240. Fault detection module 240 may be configured to compare these features with the corresponding standard features of the corresponding standard component stored in database 215, and identify an assembly fault if at least one of these features does not match the corresponding standard feature. Fault detection module 240 may be further configured to diagnose the assembly fault and determine a type and a location of the fault. Fault detection module 240 may be configured to generate an output 250. For example, output 250 may be an inspection report that includes the detected fault and its type and location. Output 250 may further include suggestions of a new routing or a connection to clear the fault. Assembly inspection tool 200 may be configured to send output 250 to display device 126 for displaying.

Figure 3:
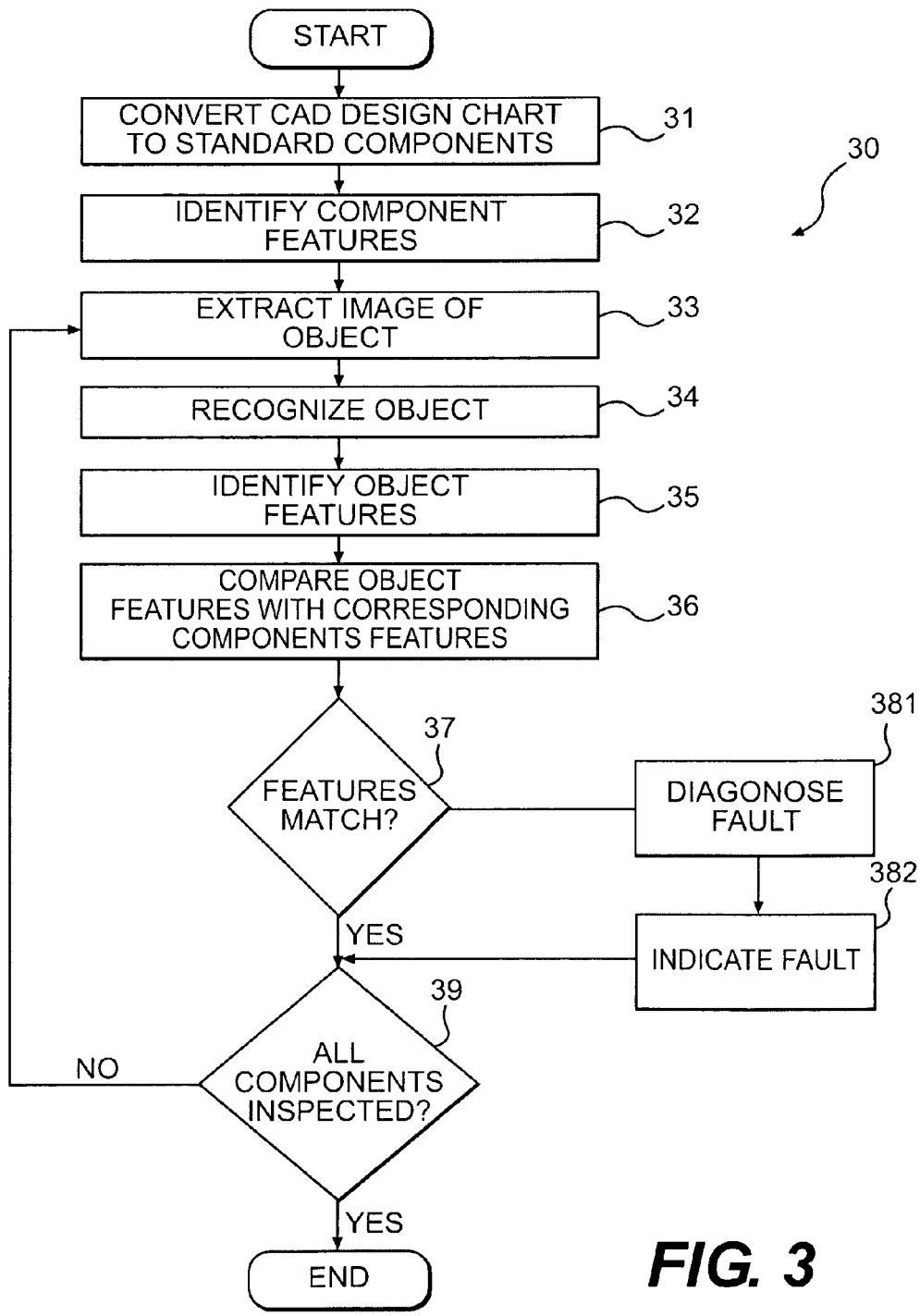
FIG. 3 is a flow chart of an exemplary operation process of the assembly inspection system, consistent with the disclosed embodiment shown in FIG. 1.

FIG. 3 is a flow chart of an exemplary operation process 30 of assembly inspection system 10, consistent with the disclosed embodiment shown in FIG. 1. Assembly inspection tool 200 may be configured to convert a CAD design chart of an assembled product 101 to a library of standard components (Step 31). Based on each converted standard component, one or more standard features may be identified (Step 32). For example, a standard hose component and a standard fastener component may be converted from the CAD design chart of an assembled engine. The dimension, color, and orientation features may be identified for a standard hose component, and the length and shape features may be identified for a standard fastener component.

Assembly inspection tool 200 may be configured to extract an image of an object using image processing techniques (Step 33). The extraction of an object may be based on the contour of the object and/or intensity segmentation of the object. Step 33 may include extracting both rigid objects and flexible objects, where the flexible objects may be grown based on the rigid objects. The object extraction process of Step 33 will be described in greater detail in FIG. 4. The extracted object in Step 33 may be recognized as a component with which the image has the highest correlation (Step 34). For example, the extracted image may be compared with each standard component converted from the CAD design chart and a correlation between them may be determined. The extracted object may be labeled as a component with which the object has the highest correlation. For example, an extracted object may be recognized as a hose. The objection recognition process of Step 34 will be described in greater detail in FIG. 5.

For each recognized component in Step 34, assembly inspection tool 200 may be configured to identify one or more features of the component based on its extracted image (Step 35). Examples of features may include color, shape, dimension, and orientation. Assembly inspection tool 200 may then be configured to compare these identified features with corresponding standard features of the corresponding standard component (Step 36) and determine whether the identified features match the corresponding standard features (Step 37).

If at least one of these identified features does not match the corresponding standard feature (Step 37: No), assembly inspection tool 200 may then be configured to diagnose the fault (Step 381). Based on the difference between each identified feature and its corresponding standard feature, the type of the fault may be determined. For example, if the identified orientation of a hose object does not match the standard orientation of a standard hose component while all the other identified features substantially match those corresponding standard features, it may be determined that a misrouting fault occurs. Other examples of assembly faults may include missing components, rubbing of two components, wrong dimension of the component, etc. A location of the fault may also be determined based on the relative position of the recognized component in the digital image. Consistent with one disclosed embodiment, an inspection report including the detected fault and its type and location may be generated. The fault may be indicated on display device 126 (Step 382). The fault indication may further include displaying suggestions of a new routing or a connection to clear the fault.

If all of those identified features match the corresponding standard feature (Step 37: Yes) or a fault has been diagnosed and indicated (Step 382), process 40 may proceed to determine whether all components contained in the digital image have been inspected (Step 39). If there is still at least one component that remains uninspected (Step 39: No), assembly inspection tool 200 may be configured to extract an image of the next object and repeat Steps 33-39. If all components contained in the image have been inspected (Step 39: Yes), process 40 may be terminated.

Figure 4:
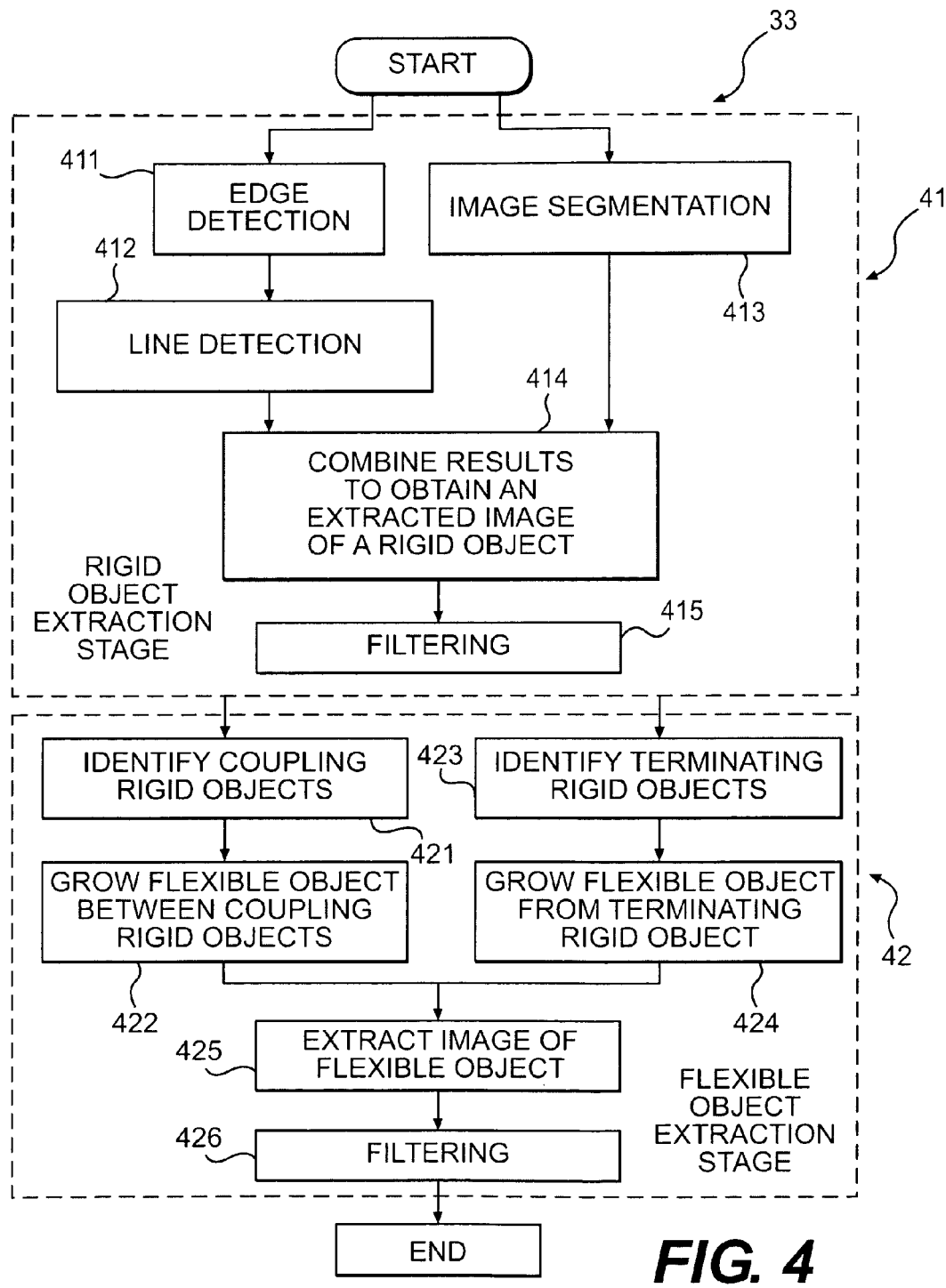
FIG. 4 is a flow chart of an exemplary operation process of an object extraction module, consistent with Step 33 shown in FIG. 3.

FIG. 4 is a flow chart of an exemplary operation process of object extraction module 220, consistent with Step 33 shown in FIG. 3. The process may include a rigid object extraction stage 41 and a flexible object extraction stage 42. As rigid object extraction stage 41 begins, object extraction module 220 may be configured to apply an edge detection procedure on the digital image of assembled product 101 to determine a contour of each object (Step 411). Edges of an object may be associated with places where significant intensity changes occur. For example, a Canny edge detection algorithm may be applied and the contour of an object may be found where the color change is dramatic. Additionally, object extraction module 220 may also be configured to detect lines associated with each object via a transform algorithm, such as, for example, a Hough Transform (Step 412).

Meanwhile, object extraction module 220 may be configured to segment the digital image into a plurality of image regions (Step 413). Image segmentation may be performed in parallel with the edge detection of Step 411 and line detection of Step 412. Image segmentation may be based on an intensity map of the digital image. For example, an intensity area that has a homogenous color may be segmented as one object image. Image segmentation may include a noise reduction step, for example, using a mean shift method, to reduce high-frequency noises and smooth the image. Image segmentation may further include a histogram transform and separation step. A histogram (i.e., an intensity map) of the digital image may be calculated, and the histogram may typically have a plurality of separate peaks. Intensity thresholds may be determined based on the plurality of separate peaks, and the digital image may be segmented based on the determined thresholds.

Object extraction module 220 may then be configured to combine results of edge detection (Step 411), line detection (Step 412), and image segmentation (Step 413), and obtain an extracted image for each rigid object (Step 414). The images may be filtered to enhance the image signal-to-noise ratio (Step 415). In rigid object extraction stage 41, object extraction module 220 may be configured to repeat Steps 411-415 until images of all rigid objects are extracted from the digital image, after which the flexible object extraction stage may begin.

During flexible object extraction stage 42, object extraction module 220 may be configured to identify coupling rigid objects such as, for example, coupling fasteners (Step 421). Object extraction module 220 may be further configured to grow a flexible object connected between every two coupling rigid objects such as, for example, a hose connected between two coupling fasteners (Step 422). The flexible object may be grown using a clustering algorithm, a region growing algorithm, a filtering algorithm, or any combinations of these algorithms. For example, growing of a flexible object may start from the boundary of one rigid object, and an image pixel adjacent to the growing frontier may be identified as a part of the flexible object if the intensity of the pixel is within a predefined range.

Alternatively, in some occasions, one of the coupling rigid components may not be shown in the digital image, and thus, the flexible assembly may seem to be connected to a terminating rigid component. Object extraction module 220 may be configured to identify terminating rigid objects such as, for example, a terminating fastener (Step 423), and grow a flexible object connected to each terminating rigid object such as, for example, a hose connected to a terminating fastener (Step 424).

Object extraction module 220 may then be configured to extract images of flexible objects grown in Steps 422 and 424 (Step 425). The images may be filtered to enhance the image signal-to-noise ratio or exclude image areas not belonging to the flexible object (Step 426). In flexible object extraction stage 41, object extraction module 220 may be configured to repeat Steps 421-426 until images of all flexible objects are extracted from the digital image.

Figure 5:
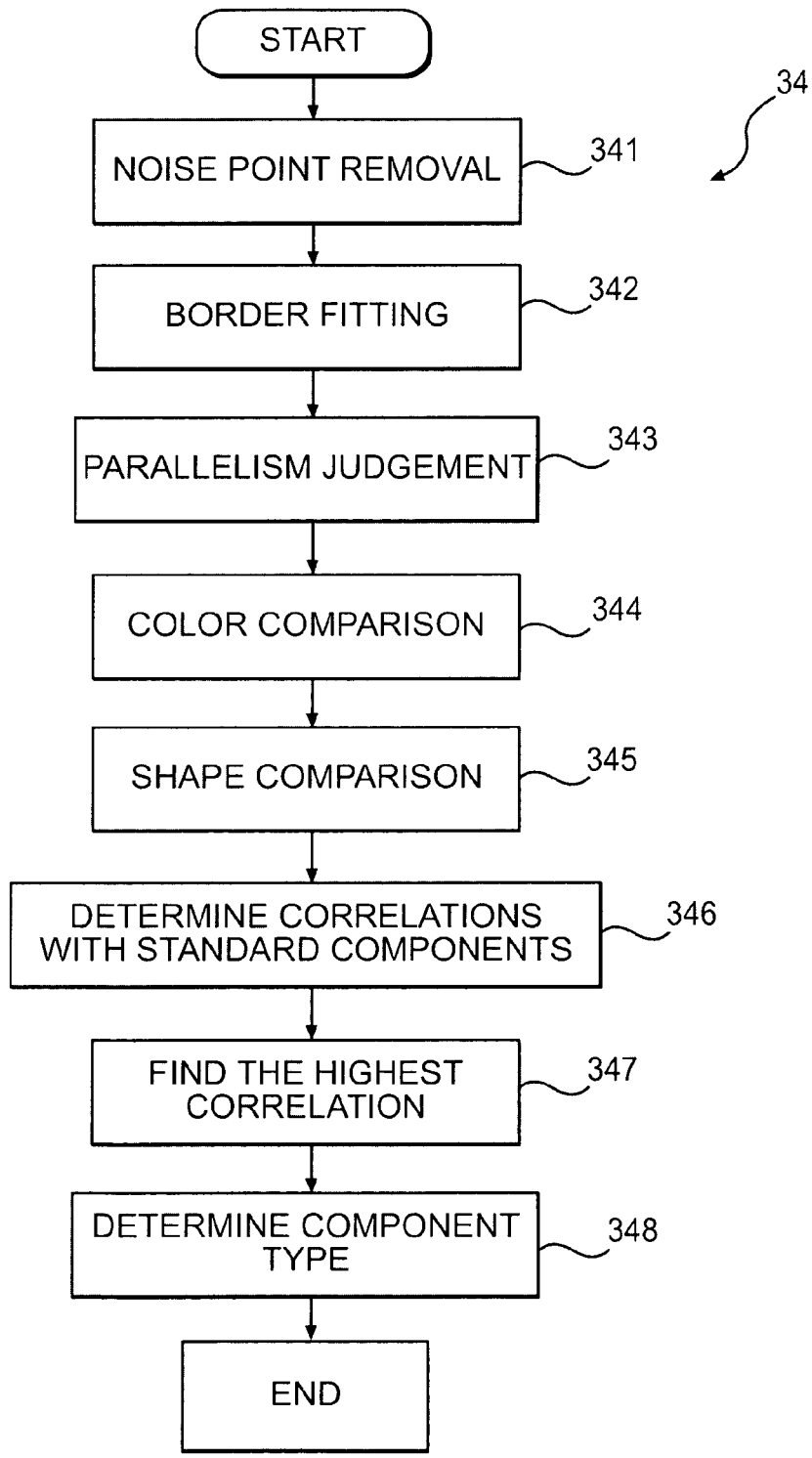
FIG. 5 is a flow chart of an exemplary operation process of an object recognition module, consistent with Step 34 shown in FIG. 3.

FIG. 5 is a flow chart of an exemplary operation process of object recognition module 230, consistent with Step 34 shown in FIG. 3. Object recognition module 230 may be configured to receive an image of each extracted object obtained in Step 33. A de-noising procedure may first be applied on the image to remove the noise points (Step 341). During the object recognition process, object recognition module 230 may be configured to communicate with database 215 to obtain one standard component at a time, and compare the extracted object with the standard component.

As shown in FIG. 3, a border-fitting between the images of the extracted objected and a standard component may be performed (Step 342), and a parallelism between the two may be determined (Step 343). Accordingly, a border-fitting coefficient that indicates the rate of fitting, and a parallelism factor that indicates the rate of parallelism, may be determined. Additionally, colors of the two images and shapes of the two objects may also be compared (Step 344 and Step 345), and their respective similarity rates may be determined.

Based on Steps 342-345, a correlation may be calculated between the extracted object and the standard component (Step 346). For example, the correlation may be determined as a weighted average of a border-fitting coefficient, a parallelism factor, a color similarity rate, and a shape similarity rate. A high correlation typically corresponds to a higher similarity between the extracted object and the standard component. After correlations corresponding to all the standard components in database 215 have been determined, a highest correlation may be found (Step 347). The extracted object may be labeled as a component of a type of the standard component corresponding to the highest correlation (Step 348).

INDUSTRIAL APPLICABILITY

The disclosed system and method may be applicable to a business organization that involves an assembly inspection process that involves flexible assemblies. An assembly inspection system 10 may include an imaging device 110 and an assembly inspection console 120 having an assembly inspection tool 200. Imaging device 110 may obtain a digital image of an assembled product. Assembly inspection tool 200 may detect an assembly fault based on the digital image and a CAD design chart of the assembled product.

For example, an assembled product 101 may be inspected. Assembled product 101 may be an engine having a hydraulic system. A digital image of assembled product 101 may be obtained by imaging device 110 and the digital image may be transmitted to assembly inspection console 120 via a transmission device 130. Assembly inspection tool 200, stored on assembly inspection console 120, may include a CAD conversion module 210, configured to convert a CAD design chart of assembled product 101 to a library of standard components that may include, for example, a plurality of hoses and fasteners. CAD conversion module 210 may be further configured to identify one or more standard features of these standard components such as, for example, color, shape, dimension, and orientation. Assembly inspection tool 200 may further include an object extraction module 220 configured to extract one or more objects from the digital image obtained by imaging device 110, and an object recognition module 230 configured to recognize the extracted object as a component, such as a hose. In particular, object extraction module 220 may be configured to extract both rigid objects and flexible objects, where the flexible objects may be grown based on the rigid objects. Object recognition module 230 may be further configured to identify one or more features for each recognized object. Assembly inspection tool 200 may also include a fault detection module 240 configured to detect an assembly fault if at least one of the identified features of a recognized object does not match the corresponding standard feature of the corresponding standard component. Fault detection module 240 may be further configured to determine a type and a location of the assembly fault.

Although the disclosed embodiments are described in association with an assembly inspection process, the disclosed inspection tool and inspection method may be used for the inspection process. The disclosed inspection tool may efficiently and effectively detect defects in a product, and ensure that the product substantially conforms to its design chart. For example, the disclosed inspection process may have improved accuracy because objects may be extracted from the image and recognized as a certain component before its features are compared to those of a standard component for the purpose of fault detection. In particular, images of flexible assemblies may be accurately extracted from the digital image by growing between/from rigid components, and the features of flexible assemblies may be identified for diagnosis purpose. Therefore, the relative position between a flexible assembly and other components may not affect the inspection result. In addition, different from the automated inspection system disclosed in the '287 publication which only detects the existence of an assembly fault when a pattern mismatch occurs, the disclosed inspection system and method may be able to identify specific components that contain the assembly fault, and further identify the type and location of the fault.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A method for assembly inspection, the method comprising:
   obtaining a digital image of an assembled product;
   extracting, by at least one processor, images of one or more objects from the digital image of the assembled product, the extracting including:
      extracting, from the digital image, images of one or more rigid objects;
      growing images of one or more flexible objects based on the extracted images of the one or more rigid objects; and
      extracting images of the one or more flexible objects;
   recognizing each of the one or more rigid or flexible objects as a component based on its extracted image and a library of standard components;
   identifying one or more features of each recognized component;
   comparing each of the one or more identified features with a corresponding standard feature of the corresponding standard component; and
   determining an assembly fault if at least one of the one or more identified features does not match the corresponding standard feature.

2. The method of claim 1, wherein extracting images of one or more rigid objects further includes:
   detecting a contour of each component;
   segmenting the digital image into a plurality of intensity areas; and
   combining each intensity area with the corresponding contour to obtain an extracted image.

3. The method of claim 1, wherein growing images of one or more flexible objects is implemented with at least one of clustering, region growing, or filtering algorithms, or any combination thereof.

4. The method of claim 1, wherein growing images of one or more flexible objects includes growing an image of a flexible object between two coupling rigid objects.

5. The method of claim 1, wherein growing images of one or more flexible objects includes growing an image of a flexible object from a terminating rigid object.

6. The method of claim 1, wherein the library of standard components is generated by:
   converting a design chart of the assembled product to a library of standard components; and
   identifying one or more standard features for each standard component.

7. The method of claim 1, wherein obtaining the digital image of the assembled product includes:
   applying a first optical signal for illuminating the assembled product;
   receiving a second optical signal containing the structure information of the assembled product; and
   converting the second optical signal to a digital image, wherein each pixel value of the digital image is proportional to a signal intensity received at each pixel.

8. The method of claim 7, wherein obtaining the digital image of the assembled product further includes:
   compressing the digital image;
   transferring the compressed digital image; and
   uncompressing the compressed digital image.

9. The method of claim 1, wherein determining an assembly fault further includes:
   diagnosing the assembly fault;
   determining a type and a location of the assembly fault; and
   providing an inspection report having the type and the location of the assembly fault.

10. The method of claim 1, wherein recognizing each of one or more objects includes:
    performing a border-fitting comparison between the extracted image with each standard component in the library of standard components;
    performing parallelism judgment based a result of the border-fitting comparison;
    calculating a correlation between the extracted image and each standard component; and
    labeling the extracted image as a component of a type of the standard component corresponding to a highest correlation.

11. The method of claim 10, wherein the correlation is determined based on at least one of a color and a shape of the component defined by the extracted image.

12. The method of claim 1, wherein the one or more features includes at least one of an orientation of the component and a dimension of the component.

13. A non-transitory computer readable storage medium having stored thereon instructions that, when executed by a processor associated with an assembly inspection system, cause the assembly inspection system to perform a method for assembly inspection, the method comprising:
    obtaining a digital image of an assembled product;
    extracting images of one or more objects from the digital image of the assembled product, the extracting including:
       extracting, from the digital image, images of one or more rigid objects;
       growing images of one or more flexible objects based on the extracted images of the one or more rigid objects; and
       extracting images of the one or more flexible objects based on the grown images of the one or more flexible objects;
    recognizing each of the one or more rigid or flexible objects as a component based on its extracted image and a library of standard components;

identifying one or more features of each recognized component;

comparing each of one or more identified features with a corresponding standard feature of the corresponding standard component; and determining an assembly fault if at least one of the one or more identified features does not match the corresponding standard feature.

14. The computer readable medium of claim 13, wherein the library of standard components is generated by:

converting a design chart of the assembled product to a library of standard components; and identifying one or more standard features for each standard component.

15. The computer readable medium of claim 13, wherein determining an assembly fault includes:

diagnosing the assembly fault;

determining a type and a location of the assembly fault; and providing an inspection report having the type and the location of the fault.

16. A system for assembly inspection, comprising:

an imaging device configured to obtain a digital image of an assembled product;

a storage device configured to store an assembly inspection tool, a library of standard components, and one or more standard features of each standard component; and a processor configured to execute the assembly inspection tool to:

extract, from the digital image, images of one or more rigid objects from the digital image of the assembled product grow images of one or more flexible objects based on the extracted images of the one or more rigid objects;

recognize each rigid or flexible object as a component based on its image and a library of standard components;

identify one or more features of each recognized component;

compare each identified feature with the corresponding standard feature of the corresponding standard component;

determine an assembly fault if at least one of the one or more identified features does not match the corresponding standard feature; and determine at least one of a type or a location of the assembly fault.

17. The system of claim 16, wherein the imaging device includes:

an optical emitter configured to applying a first optical signal for illuminating the assembled product;

an optical detector configured to receive a second optical signal containing the structure information of the assembled product; and a converter configured to convert the second optical signal to a digital image, wherein each pixel value of the digital image is proportional to a signal intensity received at each pixel.

18. The system of claim 16, further including a display device configured to display an inspection report having the type and the location of the assembly fault.

* * * * *